J. D. JONES.

AXLE BOX AND DUST GUARD.

APPLICATION FILED JULY 21, 1910.

Reissued June 30, 1914.

13,762.

2 SHEETS—SHEET 1.

Witnesses:
W. A. Burke
R. J. Hughes

Inventor.
John D. Jones
By D. Fitzenburg
Attorney.

COLUMBIA PLANOGRAPH CO., WASHINGTON, D. C.

J. D. JONES.

AXLE BOX AND DUST GUARD.

APPLICATION FILED JULY 21, 1910.

Reissued June 30, 1914.

13,762.

2 SHEETS—SHEET 2.

Witnesses:
Wa. Burke
R. Hughes

John D. Jones Inventor.
By D. Litzenberg
Attorney.

COLUMBIA PLANOGRAPH CO., WASHINGTON, D. C.

UNITED STATES PATENT OFFICE.

JOHN D. JONES, OF WALLA WALLA, WASHINGTON.

AXLE-BOX AND DUST-GUARD.

13,762. Specification of Reissued Letters Patent. Reissued June 30, 1914.

Original No. 947,105, dated January 18, 1910, Serial No. 486,497. Application for reissue filed July 21, 1910. Serial No. 573,142.

*To all whom it may concern:*

Be it known that I, JOHN D. JONES, a citizen of the United States, residing at Walla Walla, in the county of Walla Walla and State of Washington, have invented certain new and useful Improvements in Axle-Boxes and Dust-Guards; and I do hereby declare the following to be a full, clear, and exact description of the invention, such as will enable others skilled in the art to which it appertains to make and use the same.

My invention relates to improvements in axle boxes and dust guards, or what may be generally designated as journal boxes.

The invention has among its salient objects, to provide a journal box comprising companion members, one of which is a casing or holding member, and the other a removable inner member or box containing the brass or a bearing member, lubricant retaining means, and dust guard therein, whereby said inner member is adapted to be bodily inserted into and removed from said holding member; to provide in such a journal box, an inner or containing member in which it is possible to place packing material both above and below the journal proper and thus more uniformly distribute and apply the lubricant; to provide a journal box of the character referred to in which it is possible to apply lubricant directly along the top or bearing surface of the journal; to provide in such an inner box or containing member a bearing member or brass of such construction that lubricant can be applied therethrough to the bearing face thereof and to the top of said journal; and, in general, to provide an improved journal box of the character referred to which is simple in its construction and application, and effective in performing the functions hereinbefore mentioned.

The invention will be readily understood from the following description, reference being had to the accompanying drawings, in which,—

Figure 1:
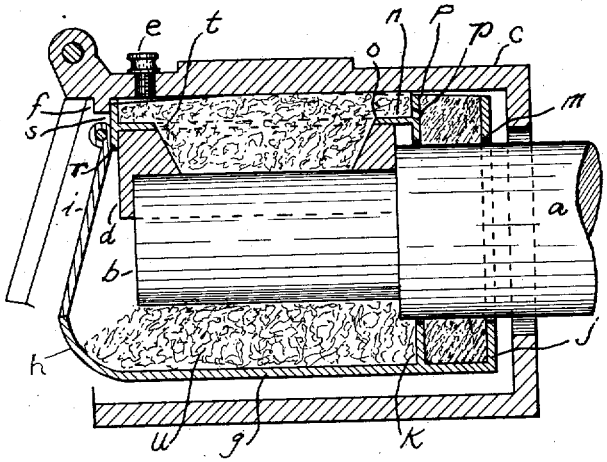
Figure 2:
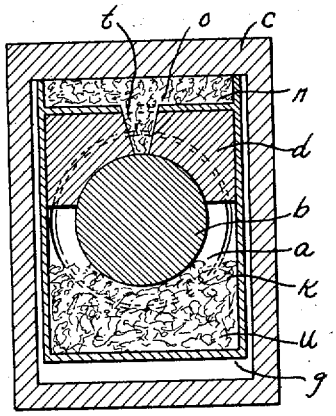
Figure 3:
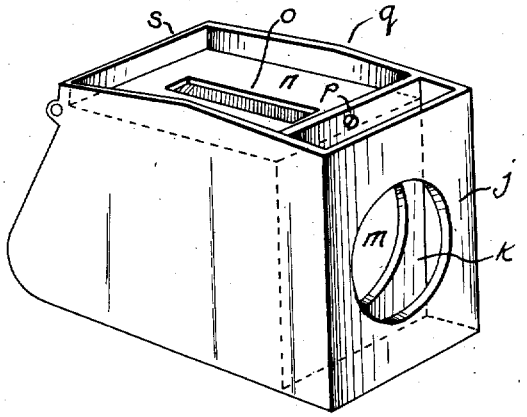
Figure 4:
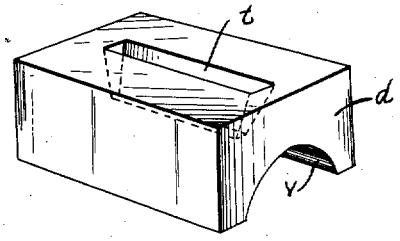

Figure 1 is a longitudinal sectional view showing my invention as applied to a car axle; Fig. 2 is a cross sectional view taken on a vertical line through the middle of Fig. 1; Fig. 3 is a perspective view of the removable inner box or containing member; and Fig. 4 is a perspective view of a bearing member, adapted to be placed within said inner or containing member.

Referring now to the drawings, *a* represents a car axle and *b* the journal end thereof. *c* represents the outer casing or holding member, corresponding to the usual car axle box, and is adapted to receive the end of the axle and the journal thereof, as shown. *d* represents a bearing member or brass provided with a grooved bearing face adapted to rest upon the journal of said axle, as shown. The casing *c* is provided with an opening for the application of lubricant, which is ordinarily closed by a screw cap *e* or equivalent device. The casing is preferably provided across the under side of its top at its outer end with a depending rib *f* for holding the inner box in place. This inner box is shown in perspective in Fig. 3, and in section in Figs. 1 and 2. It has a bottom *g*, preferably curved upwardly, as shown at *h* and it has an open outer end which is preferably closed by a hinged lid *i*. Said inner box is provided on its interior with two upright partitions or walls as *j* and *k*, perforated as shown at *m* for the passage of the journal and axle therethrough. The side walls rise above the top *n* to form an open space or depression thereabove to retain packing material, as indicated in Fig. 3, with a wedge-shaped opening or passageway *o* through said top leading into the interior of said inner box or containing member.

*p* represents a hole through the upper part of the partition *k*, through which lubricant may pass to the space between the partitions *j* and *k*. The side walls of said inner box are inclined, as indicated at *q*, from the middle toward the ends thereof. These walls form a support upon which the holding member *c* rests, as shown in Fig. 1. By reason of the inclined shape of these walls, a rocking or tilting supporting engagement between the inner and outer boxes is provided. Said inner box is provided across the top of its outer end with a depending rib, as *r*, adapted to confine the brass *d* in proper position. Above said rib, the front end wall of said inner box rises, as at *s*, and is adapted to engage with the rib *f* on the inside of the casing. The brass *d* is provided with a wedge-shaped opening, as *t*, adapted to register with the opening *o* in the inner member, as indicated in Figs. 1 and 2. The top of the inner box or containing member, the opening *t* in the brass *d* and the space below the journal *b*, and the space above and below the axle *a*, are packed with any suitable soft absorbent packing *u*, such as wool.

The vertical chamber or space between the partitions *j* and *k* is adapted removably to receive the ordinary dust guard, which, as clearly shown in the drawings, is made of wool felt, or other well known material. In ordinary forms of axle boxes, when it is desired to renew the dust guard, it is necessary to jack up the car and run out the wheels. This operation cannot be performed on the road. It requires that the car shall be run into the shop. With the axle box and dust guard of the present invention, such a burdensome and difficult operation is not required. Moreover, the dust guard can be renewed on the road, and this operation is as easy as changing the brasses. It is only necessary to remove the inner box, withdraw the old dust guard from its chamber between the partitions *j* and *k*, replace it with a new guard, and reinsert the inner box.

The inner box, with the parts therein contained, it will be noted, constitutes in itself a complete journal box, adapted to be bodily inserted into the casing, over the journal and end of the axle, or removed bodily therefrom, so that in case of an accident or damage to one box, it is only necessary to lift the casing in its place until the rib *f* clears the front end wall of the inner box or containing member at *a*, when the inner box with the brass and packing can all be removed together, and another inner box, brass and packing inserted in its place, without loss of much time.

This invention makes possible a great saving of time necessary to put a heated or damaged axle box in condition for use. It simply means the substitution of a fresh box, with contents, for the disabled one. A simple and effective means is also provided for supplying lubricant to the top of the journal, as well as below it, for the lubricant which is supplied to the top of the brass seeps through the packing within openings *o* and *t*, onto the journal, and to the space and packing below said journal, within the inner box. This results in the use of a less quantity of oil than when supplied only from below, as is the case in the present ordinary box. The inner box or containing member, under such a construction, is smaller than the ordinary journal box and more snugly surrounds the journal. This makes possible, not only a saving of oil, but a saving in the quantity of wool waste or other packing material used. The ordinary journal box requires approximately an average of about twenty four ounces of waste, whereas under my construction both the upper and the lower space of the inner or removable containing box can be properly packed with not to exceed eight ounces of waste. A further advantage in my construction is the fact that this waste packing above the journal is inaccessible until the inner box is removed from the casing, thus preventing tramps and other malicious persons from removing waste from the journal box for use in building fires, as is so often done from the ordinary type of journal box. This, unless discovered in time, results in a hot box and perhaps damage. In my construction, though the packing may be removed from the lower part of the inner box, the packing above the journal and out of reach from the outside, thoroughly lubricates the journal from above. The inner box, in addition to containing the brass and the means for retaining lubricant therefor, also, by reason of its construction, forms an effective dust guard about the axle to prevent the admission of dust and dirt to the journal box. Thus it will be understood that the present invention provides a construction in journal boxes wherein an inner or containing member with the brass, lubricant, and dust guard, can be bodily inserted into and removed from an outer member with the least amount of work possible and without the loss of time in repacking and lubricating the old one.

While I have shown and described one form of the invention, I am aware that changes in form, proportions, size, materials and minor details may be made without departing from the spirit of the invention, and I do not limit the invention to the particular showing made for purposes of illustration.

I claim:

1. The combination of a car axle provided with a journal, an axle-box adapted to surround said journal, said axle-box being provided with an opening for the supply of lubricant, a packing box removably held in said axle-box, and a slotted bearing within said packing box, said axle-box being provided with a downwardly projecting rib for holding the packing box therein, said packing box being provided with a downwardly projecting rib for holding the bearing against the end of the car axle, the top of said box being provided with a wedge-shaped opening, and said box being provided with vertical partitions perforated for the passage of the car axle, one of said partitions being provided with a perforation for the passage therethrough of lubricating material, substantially as described.

2. The combination of a car axle provided with a journal, a bearing adapted to rest on said journal, said bearing being provided with a wedge-shaped opening therethrough, a packing box surrounding said bearing and the end of the car axle, said packing box being provided with a lid, with a downwardly projecting rib for holding said bearing in contact with said axle, with a perforated top, with vertical partitions forming a separate chamber, said partitions being perforated for the passage therethrough of the car axle and one of said partitions being provided with a hole permitting the passage of lubricating material therethrough, the top of said box being provided with an upwardly projecting end, and an axle-box surrounding said packing box and the end of the car axle, said axle box being provided with an opening for the admission of lubricant, means for closing said opening, and with a downwardly projecting rib for holding said packing box in said axle-box, substantially as described.

3. In an axle box, the combination with the axle and its journal, and a casing having a closed top and an open outer end with a rib depending from the top across said open end; of a box removably inserted within said casing with the upper edges of its side and front walls contacting with the top of the casing and its front wall standing behind said rib, a brass within said box and resting upon said journal, and means for holding it removably in the box.

4. In an axle box, the combination with the axle and its journal, and a casing having a closed top and an open outer end with a rib depending from the top across said open end; of a box removably inserted within said casing with the upper edges of its side and front walls contacting with the top of the casing and its front wall standing behind said rib and itself having an opening with a depending rib across the top of the opening, and a brass within said box behind its rib and resting upon said journal.

5. The combination with a casing, and an axle and its journal inserted therein; of a box removably inserted in the casing and embodying a bearing chamber, a dust guard chamber and a lubricant chamber, and having passages forming communication between the lubricant chamber and the other chambers.

6. The combination with a casing and axle inserted therein; of a box removably inserted in the casing and surrounding said axle, the box being provided with a depression in its upper portion and an opening from the depression to the interior of the box, and a brass removably inserted in the box and provided with an opening forming communication between the recess and the axle.

7. In an axle box, the combination with the axle and its journal, and a casing having means for admitting lubricant through its top; of a brass upon the journal and having an upright opening, a box within the casing and having a depressed top producing a lubricant chamber, said top having an opening registering with that in the brass, and means for holding the box and brass removably within said casing.

8. In an axle box, the combination with the axle and its journal, and a casing having means for admitting lubricant through its top; of a brass upon the journal and having an upright opening, a box within the casing and having a depressed top producing a lubricant chamber and upright spaced partitions surrounding the axle and producing a dust guard chamber, said top having an opening registering with that in the brass and one of the partitions having a hole producing communication between the lubricant and dust guard chambers, and means for holding the box and brass removably within said casing.

9. In an axle box, the combination with an axle and its journal, and a casing adapted to surround them and provided with an opening for the admission of lubricant, the casing having an open outer end with a rib depending from its top across said open end; of a slotted brass, a box within the casing having a depressed top with an opening registering with the slot in the brass and its front end wall engaging behind said rib and in front of said brass, and transverse partitions within said box producing a dust guard chamber surrounding the axle in rear of the brass, the innermost partition having a hole communicating with the space above said depressed top, for the purpose set forth.

10. In an axle box, the combination with an axle and its journal, and a casing adapted to surround them, the casing having an open outer end with a rib depending from its top across said open end; of a brass having a wedge-shaped opening, a box inclosing the brass and having a depressed top with an opening registering with that in the brass, its side and front walls rising above said top to produce a lubricant chamber and said front wall engaging behind said rib and itself having a depending rib engaging over the front end of the brass, and a partition across the box and having a perforation for the passage of the axle and space in rear of the partition for dustguard packing, said partition being pierced with a hole forming communication between the lubricant chamber and said packing, for the purpose set forth.

JOHN D. JONES.

Witnesses:
L. E. MEACHAM,
ALLEN H. REYNOLDS.

Copies of this patent may be obtained for five cents each, by addressing the "Commissioner of Patents, Washington, D. C."